No. 791,035.

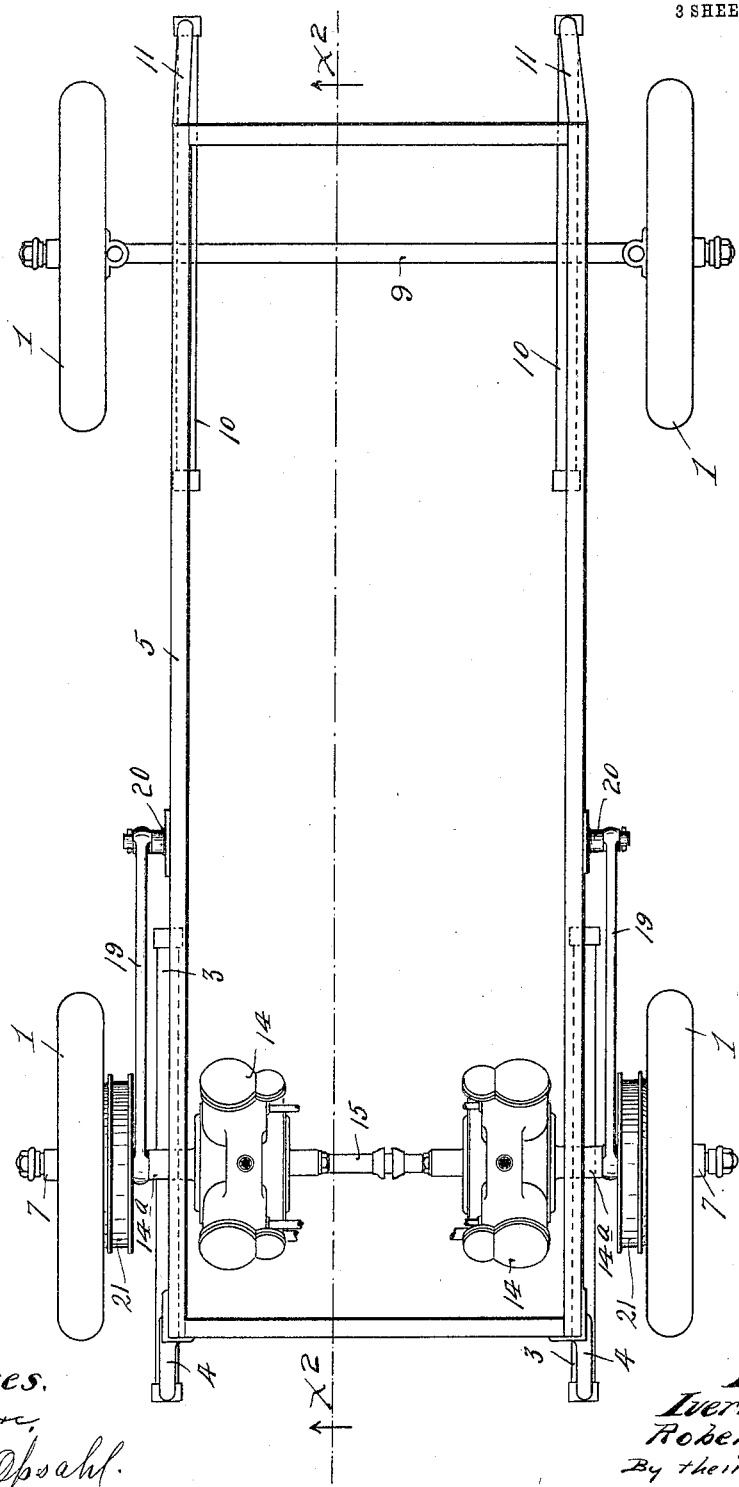

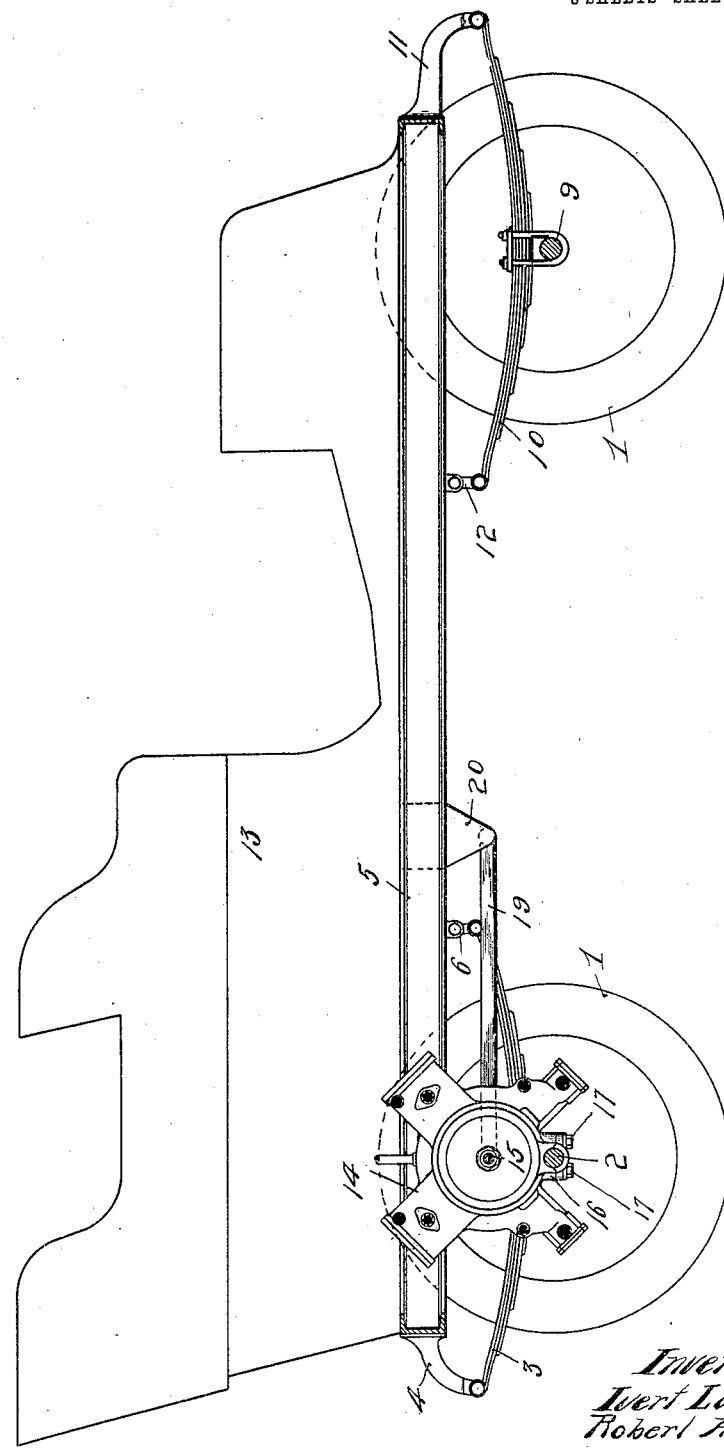

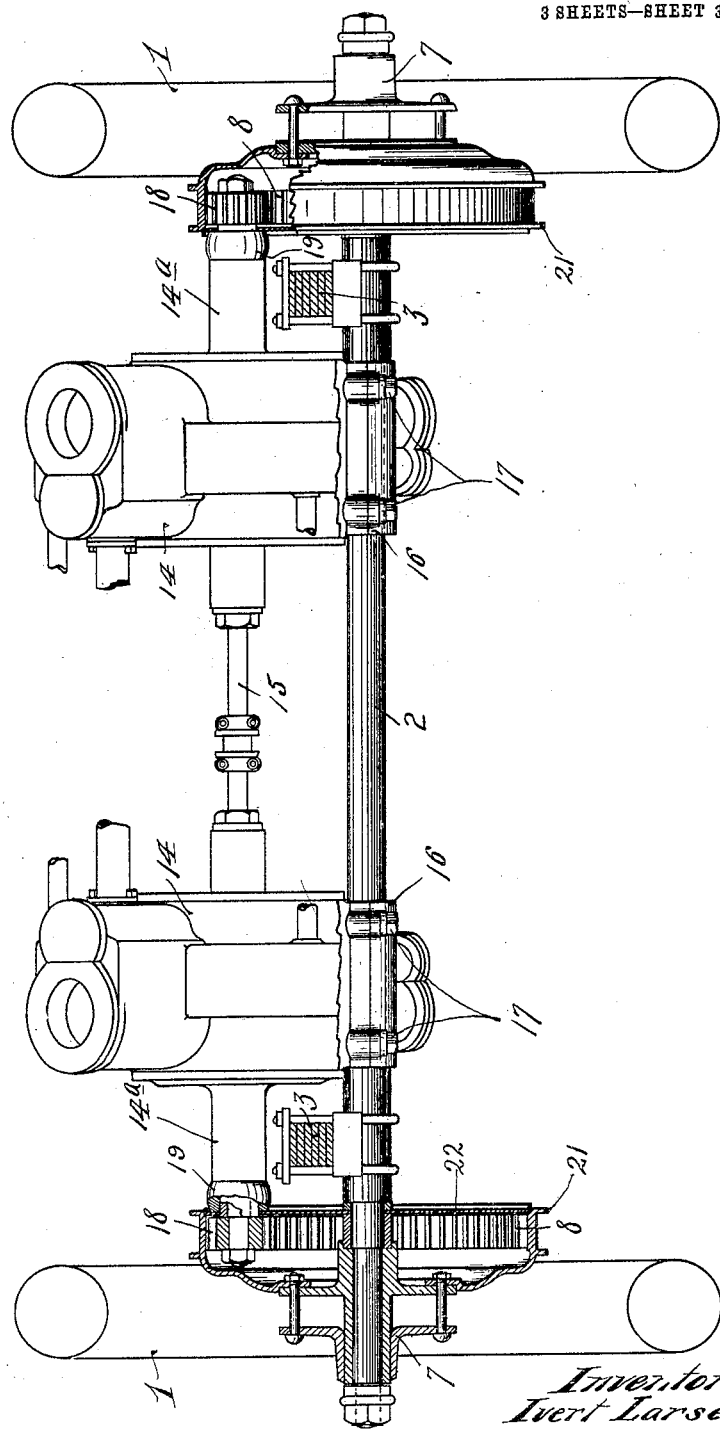

Patented May 30, 1905.

UNITED STATES PATENT OFFICE.

IVERT LARSEN AND ROBERT HARDIE, OF CHICAGO, ILLINOIS.

MOTOR-MOUNTING FOR MOTOR-VEHICLES.

SPECIFICATION forming part of Letters Patent No. 791,035, dated May 30, 1905.

Application filed October 6, 1903. Serial No. 175,946.

*To all whom it may concern:*

Be it known that we, IVERT LARSEN and ROBERT HARDIE, citizens of the United States, residing at Chicago, in the county of Cook and State of Illinois, have invented certain new and useful Improvements in Motor-Mountings for Motor-Vehicles; and we do hereby declare the following to be a full, clear, and exact description of the invention, such as will enable others skilled in the art to which it appertains to make and use the same.

Our present invention relates to running-gears for motor-propelled vehicles, and is especially directed to novel and improved means for mounting one or more multicylinder-motors, as will hereinafter more fully appear.

The invention consists of the novel devices and combinations of devices hereinafter described, and defined in the claims.

In an application for Letters Patent of the United States filed by us, of even date herewith, entitled "Air-distribution system for road-vehicles," we have illustrated a propelling system in which one or more multicylinder-engines are driven by compressed air supplied from the compressor, which in turn is driven by an explosive-engine, and the said multicylinder-motor therein briefly outlined is illustrated in detail, and the novel features thereof are more fully disclosed and are claimed in another application filed of even date herewith and entitled "Multicylinder-engines."

Our present invention, it may here further be stated, has for its particular object the provision of improved means for mounting multicylinder air-motors of the character disclosed in the companion applications above noted.

The invention is illustrated in the accompanying drawings, wherein—

Figure 1 is the plan view of the running-gear of an automobile or motor-propelled road-vehicle and in which the multicylinder air-motors are mounted in accordance with our invention. Fig. 2 is a longitudinal section taken on the line $x^2\ x^2$ of Fig. 1 and further showing diagrammatically the body of the vehicle; and Fig. 3 is a rear elevation of the running-gear, some parts being sectioned and some being indicated only in diagram.

Like characters indicate like parts throughout the several views.

The wheels of the vehicle are designated by the numeral 1 and are shown only in diagram. The rear axle 2 is attached in the usual way to the intermediate portions of semi-elliptical leaf-springs 3, the rear ends of which springs, as shown, are pivotally attached to rearwardly-projecting brackets 4 of a rectangular frame 5, while their forward ends are attached to the sides of said frame by means of short links 6. The hubs 7 of the rear or traction wheels 1 are loosely journaled on the ends of the rear axle 2, and each hub carries an internal gear 8.

The front axle 9, like the rear axle 2, is attached to the intermediate portions of semi-elliptical springs 10, which springs at their forward ends are pivoted to forwardly-projecting brackets 11 of the frame 5, while their rear ends are attached to said frame by short links 12.

The numeral 13 indicates the body or box of the vehicle, which body is secured to the frame 5 in the usual or any suitable way.

In the preferred construction illustrated there is provided two distinct and independent multicylinder air motors or engines, the cylinders of each engine being rigidly united in a common casting, which is indicated as an entirety by the numeral 14. The several cylinders of a particular engine radiate from the axis of a common crank-shaft 15, which receives motion from the several pistons of the engine. At a point located a considerable distance below its crank-shaft 15 each engine-casting 14 is provided with means for rigidly securing it to the rear axle 2, such means being preferably a split clamping-sleeve 16 and machine-screws 17. At its outer end each engine crank-shaft 15 carries a pinion 18, that meshes with the corresponding internal gear 8. It is of course evident that the rear or traction wheels of the vehicle are driven independently, one for each multicylinder air-engine, through the coöperating internal gears 8 and crank-shaft pinions 18. The multicylinder air-motors are approximately balanced or counterpoised on the rear axle and to maintain the same approximately in such counterpoised position thrust-links 19 are pivotally attached at their rear ends to the crank-shaft bearings 14ª of the motor-castings 14, being at their forward ends pivoted to parts, such as the depending brackets 20, that are rigid on the sides of the frame 5, and hence fixed with respect to the vehicle body or box.

With the air engines or motors mounted as above described it will be seen that the frame-castings 14 of the motors constitute cranks for holding the pinions 18 always in proper mesh with the internal gears 8. It will be further noted that the said multicylinder-motors do not receive vertical movements with the body of the vehicle, but, on the contrary, that vertical movements of the body of the vehicle will slightly oscillate the motors from front to rear of the vehicle. Stated in another way, if the rear axle 2 in running over an obstacle should be suddenly raised it would in compressing the springs 3 be moved slightly forward with respect to the body of the vehicle, and under such movement each motor would be oscillated to some extent, both on the axis of said axle 2 and on the axis of its crank-shaft 15, but would at no time be moved far away from its counterpoised position. It will thus be seen that vertical movements, both of the rear axle and of the body of the vehicle, oscillate the motors from front to rear of the vehicle, but that the said motors are properly held in position by the thrust-links 19.

The external portions of the internal gears 8 are constructed to afford brake-pulleys 21. Furthermore, these internal gears or combined internal gears and brake-pulleys, together with non-rotary disk-like plates 22, mounted on the axle 2 and perforated to pass the engine crank-shafts therethrough, afford approximately dust-proof housings or cases for the internal gear-teeth and coöperating pinions.

It will of course be understood that the construction above described is capable of modification within the scope of our invention as herein set forth and claimed and that the invention is capable of application to motor-propelled vehicles that run upon rails, as well as to those that run over ordinary roads. The motor itself may take various forms, and the body of the vehicle may be spring-mounted on the running-gear in many different ways, all within the scope of our invention. For the purposes of this case any part which moves with the body of the vehicle may be treated as a portion of the vehicle-body.

What we claim, and desire to secure by Letters Patent of the United States, is as follows:

1. The combination with a running-gear, and a body spring-mounted thereon, of a motor having its frame mounted on one of the axles of the running-gear in an approximately balanced position, with said frame extending vertically from said axle, and an approximately horizontally extended link connecting the vehicle-body with the frame of said motor at a point vertically offset from said axle, substantially as described.

2. The combination with a running-gear, at least one of its traction-wheels carrying a gear, of a motor having a frame mounted on the same axle as the said traction-wheel, and having a driving-shaft equipped with a pinion meshing with said gear, the said motor-frame constituting a crank for holding the said pinion and gear always in proper mesh.

3. The combination with a running-gear having gear-equipped rear traction-wheels loosely mounted on the rear axle, of a body spring-mounted on the said running-gear, a pair of independent motors on said rear axle, each motor having its own crank-shaft, pinions on said crank-shafts, meshing with the corresponding traction-wheel gears, and thrust-links pivotally connecting the frames of said motors to said vehicle-body, and holding said motors in approximately counterpoised positions, substantially as described.

4. The combination with a running-gear, the traction-wheels of which carry toothed gears and are loosely mounted on the rear axle, of a body spring-mounted on said running-gear, a pair of independent multicylinder motors or engines, each having its own crank-shaft, and having its frame mounted on said rear axle, a pinion on each engine crank-shaft meshing with the corresponding traction-wheel gear, and thrust-links pivotally connecting the motor-frames to said vehicle-body, and holding the said motors in approximately counterpoised positions, substantially as described.

5. The combination with the running-gear, of internal gears carried by the traction-wheels, said gears having their exteriors constructed to afford brake-pulleys, of motor-driven crank-shafts having pinions meshing with said internal gears, substantially as described.

In testimony whereof we affix our signatures in presence of two witnesses.

IVERT LARSEN.
ROBERT HARDIE.

Witnesses:
E. N. SHERBURNE,
MRS. T. C. RUCK.